United States Patent
Vicquery et al.

(10) Patent No.: US 9,973,085 B2
(45) Date of Patent: May 15, 2018

(54) OUTPUT VOLTAGE CONTROL IN OVERCURRENT CONDITIONS FOR SWITCHING CONVERTERS

(71) Applicant: STMICROELECTRONICS S.R.L., Agrate Brianza (IT)

(72) Inventors: Jeanpierre Vicquery, Brusson (IT); Emilio Volpi, Charvensod (IT)

(73) Assignee: STMICROELECTRONICS S.R.L., Agrate Brianza (IT)

(*) Notice: Subject to any disclaimer, the term of this patent is extended or adjusted under 35 U.S.C. 154(b) by 0 days. days.

(21) Appl. No.: 15/218,794

(22) Filed: Jul. 25, 2016

(65) Prior Publication Data

US 2018/0026537 A1    Jan. 25, 2018

(51) Int. Cl.
| | |
|---|---|
| H02H 7/10 | (2006.01) |
| H02M 3/158 | (2006.01) |
| H02M 1/08 | (2006.01) |
| H02M 1/32 | (2007.01) |
| G05F 1/00 | (2006.01) |

(52) U.S. Cl.
CPC ........... H02M 3/158 (2013.01); H02M 1/08 (2013.01); H02M 1/32 (2013.01)

(58) Field of Classification Search
CPC ........ H02M 3/156; H02M 3/158; H02M 1/32; H02M 1/08
USPC ........ 363/50, 55, 56.01, 56.02, 56.03, 56.04
See application file for complete search history.

(56) References Cited

U.S. PATENT DOCUMENTS

| | | | | |
|---|---|---|---|---|
| 2006/0290333 A1* | 12/2006 | Fukushi | ................... | H02M 1/32 323/277 |
| 2009/0212851 A1* | 8/2009 | Yamashita | ............... | H02M 1/32 327/538 |
| 2010/0067152 A1* | 3/2010 | Nakahashi | ............... | H02M 1/32 361/18 |
| 2015/0028823 A1* | 1/2015 | Li | .............................. | G05F 1/66 323/234 |
| 2015/0355654 A1* | 12/2015 | Ueno | ....................... | G05F 1/575 323/281 |

\* cited by examiner

*Primary Examiner* — Alex Torres-Rivera
(74) *Attorney, Agent, or Firm* — Seed IP Law Group LLP

(57) ABSTRACT

A method and apparatus for controlling a converter are provided. In the method and apparatus, a converter is operated in accordance with a duty cycle and based on a difference between a feedback signal representing an output voltage of the converter and a reference signal. An overcurrent condition is detected in the converter. In response to detecting the overcurrent condition, the duty cycle used to operate the converter is limited and the reference signal is made to track the feedback signal to mitigate an output voltage overshoot at an end of the overcurrent condition.

18 Claims, 12 Drawing Sheets

OUTPUT VOLTAGE CONTROL IN OVERCURRENT CONDITIONS FOR SWITCHING CONVERTERS

BACKGROUND

Technical Field

This application is directed to controlling the operation of a converter and, in particular, to a control circuit that controls the converter when a duty cycle limit is imposed as a result of detecting an overcurrent condition.

Description of the Related Art

Converters, such as DC-DC converters, which include buck converters and boost converters, are widely used in a variety of electronic applications. A converter provides an output voltage that is a function of an input voltage to the converter. Converters are typically operated in accordance with a duty cycle that dictates the switching time of a power stage of the converter and, thus, its output voltage.

Limits may be imposed on the duty cycle of the converter in order to prevent a load from drawing more current than that for which the converter is rated leading to a drop of the converter output voltage and the related feedback voltage. Once duty cycle limiting ends, a mismatch between a reference voltage and the changed feedback voltage causes the output voltage of the converter to undesirably overshoot.

It is desirable to prevent and mitigate the adverse impact on the output voltage after an overcurrent condition ends.

BRIEF SUMMARY

In an embodiment, a device includes a voltage converter, a voltage control stage, an overcurrent control stage and a reference voltage control stage. The voltage converter has an input and an output. The voltage converter is configured to receive, at the input, a control signal for operating the voltage converter in accordance with a duty cycle and provide, at the output, an output voltage. The voltage control stage has a first input coupled to the output of the voltage converter, a second input, a third input and an output coupled to the input of the voltage converter. The voltage control stage is configured to receive, at the first input, a feedback voltage signal representative of the output voltage, receive, at the second input, a reference voltage signal, receive, at the third input, an overcurrent protection signal, generate the control signal based on a difference between the feedback voltage signal and the reference voltage signal, limit the duty cycle of the control signal in response to the overcurrent protection signal being asserted, and output the control signal at the output of the voltage control stage.

The overcurrent control stage has an input coupled to the output of the voltage converter and an output coupled to the third input of the voltage control stage. The overcurrent control stage is configured to detect an overcurrent condition in the voltage converter, assert the overcurrent protection signal in response detecting the overcurrent condition and output the overcurrent protection signal at the output of the overcurrent control stage. The reference voltage control stage has an input coupled to the output of the overcurrent control stage and an output coupled to the second input of the voltage control stage. The reference voltage control stage is configured to receive the overcurrent protection signal, in response to the overcurrent protection signal being asserted, enable a reference voltage control phase that causes the reference voltage signal to track the feedback voltage signal, and output the reference voltage signal at the output of the reference voltage control stage.

In an embodiment, a method includes operating a converter in accordance with a duty cycle and based on a difference between a feedback signal representing an output voltage of the converter and a reference signal. The method also includes detecting an overcurrent condition in the converter and in response to detecting the overcurrent condition limiting the duty cycle used to operate the converter and causing the reference signal to track the feedback signal to mitigate an output voltage overshoot at an end of the overcurrent condition.

DETAILED DESCRIPTION

Figure 1:
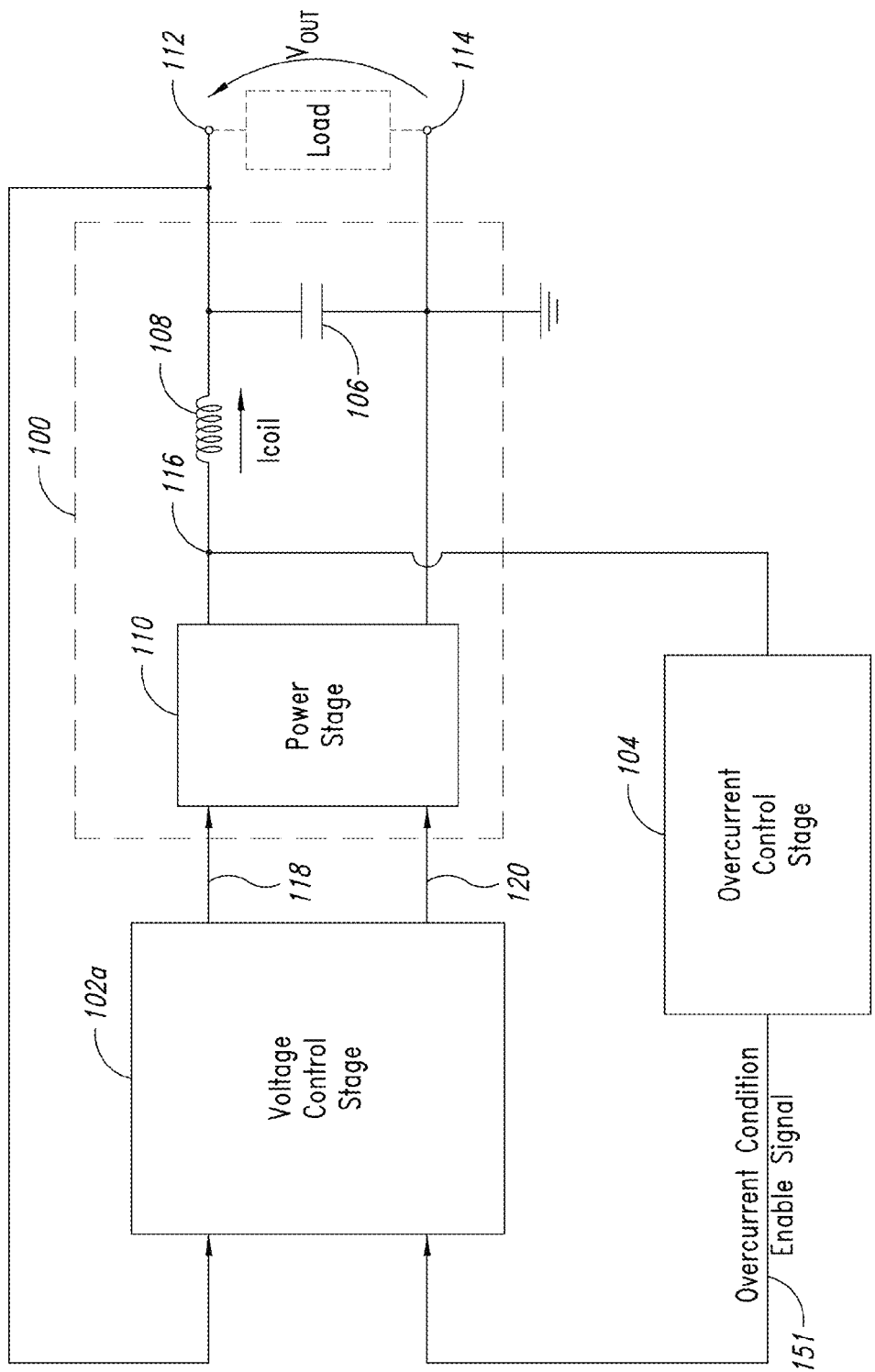
FIG. 1 shows a schematic of a converter controlled by a voltage control stage and an overcurrent control stage.

FIG. 1 shows a schematic of a converter 100 controlled by a voltage control stage 102*a* and an overcurrent control stage 104. The converter 100 comprises a capacitance 106, an inductance 108 and a power stage 110. Even though the capacitance 106 and inductance 108 are shown to be as part of the converter 100, it is noted that in various embodiments, the capacitance 106 and inductance 108 may be external in relation to the converter (for example, the capacitance 106 and inductance 108 may be external components). The capacitance 106 is coupled between a voltage output node 112 and a ground node 114. The inductance 108 is coupled between the voltage output node 112 and an intermediary node 116. The power stage 110 of the converter 100 is coupled between the intermediary node 116, the ground node 114 and an output of the voltage control stage 102a. It is noted that the power stage 110 may be coupled to a different node (having a zero reference voltage for grounding) than the ground node 114.

A first input of the voltage control stage 102a is coupled to the voltage output node 112 and a second input of the voltage control stage 102a is coupled to an output of the overcurrent control stage 104. An input of the overcurrent control stage 104 is coupled to the intermediary node 116.

Even though the converter 100 is shown in FIG. 1 as an inductance-capacitance filter (LC filter) coupled to the power stage 110, those skilled in the art recognize that the converter 100 may be realized using alternative circuitry without departing from the teachings of the embodiments described herein.

The converter 100 produces, at the voltage output node 112, an output voltage (denoted as $V_{OUT}$). The output voltage 112 is used to power or drive a load. The output voltage is a function of an input voltage applied at the power stage 110. The output voltage is also a function of the duty cycle used in operating the power stage 110. The power stage 110 may comprise a number of switches (for example, transistors) and diodes that are operable to drive the converter 100 in accordance with the duty cycle. During a first period (for example, high side of a control signal, representing the duty cycle D), the input voltage is applied to the intermediary node 116. During a second period that is complementary to the first period (for example, low side of the control signal, represented by 1-D), the input voltage is removed from the intermediary node 116. Removing the voltage results in decreasing the current through the inductance 108 and causing the capacitance 106 to become a voltage source for providing the output voltage. The inductance 108 may be a current source that "re-fills" the capacitance 106.

As discussed above, the first input of the voltage control stage 102a is coupled to the voltage output node 112. Accordingly, the voltage control stage 102a receives at the first input a signal representative of the output voltage. The voltage control stage 102a compares the output voltage with a reference voltage and adjusts or modulates the duty cycle based on the comparison. The voltage control stage 102a adjusts the duty cycle to keep the output voltage at a desired level. Thus, the converter 100 continues to supply a desired output voltage to the load. The voltage control stage 102a increases the duty cycle if the output voltage is below the reference voltage and vice-versa. Increasing the duty cycle used in driving the converter 100 increases the output voltage, while decreasing the duty cycle decreases the output voltage.

The voltage control stage 102a outputs first and second power stage driving signals 118, 120 to the power stage 110. The first and second power stage driving signals 118, 120 may be used to drive two switches of the power stage 110 in accordance with the duty cycle. For example, the first power stage driving signal 118 may be asserted during the duty cycle portion of the control period and the second power stage driving signal 120 may be asserted during the low side of the control period. Even though two power stage driving signals 118, 120 are described herein, it is noted that another number of driving signals may be used in alternative embodiments.

The overcurrent control stage 104 limits the duty cycle of the converter 100 during an overcurrent condition. When an output current supplied to the load, which is the same as the current that runs through the inductance 108 (denoted $I_{coil}$), is greater than a rated current (or a current threshold), an overcurrent condition is deemed to exist. When the output current is greater than the rated current, damage may occur to the components of the converter 100. The current ($I_{coil}$) has a triangular shape whose average value is the load current. An overcurrent condition threshold is applied to $I_{coil}$ that should not exceed the rated current of the converter 100.

The overcurrent control stage 104 detects whether an overcurrent condition occurs and asserts an overcurrent condition enable signal 151 that is output to the voltage control stage 102a. The voltage control stage 102a limits the duty cycle based on assertion of the overcurrent condition enable signal 151. Limiting the duty cycle keeps the output current within the rated current. During operation, the voltage control stage 102a adjusts the duty cycle (by increasing or decreasing the duty cycle) to maintain the output voltage as close as possible to the desired output voltage. However, under certain conditions, the load may draw a greater amount of output current than rated for the converter 100. When such a condition occurs, the overcurrent control stage 104 counteracts the effect of the voltage control stage 102a and limits the duty cycle. Limiting the duty cycle decreases the output current provided by the power stage 110 ($I_{coil}$) and prevents damage to the converter 100.

Figure 2:
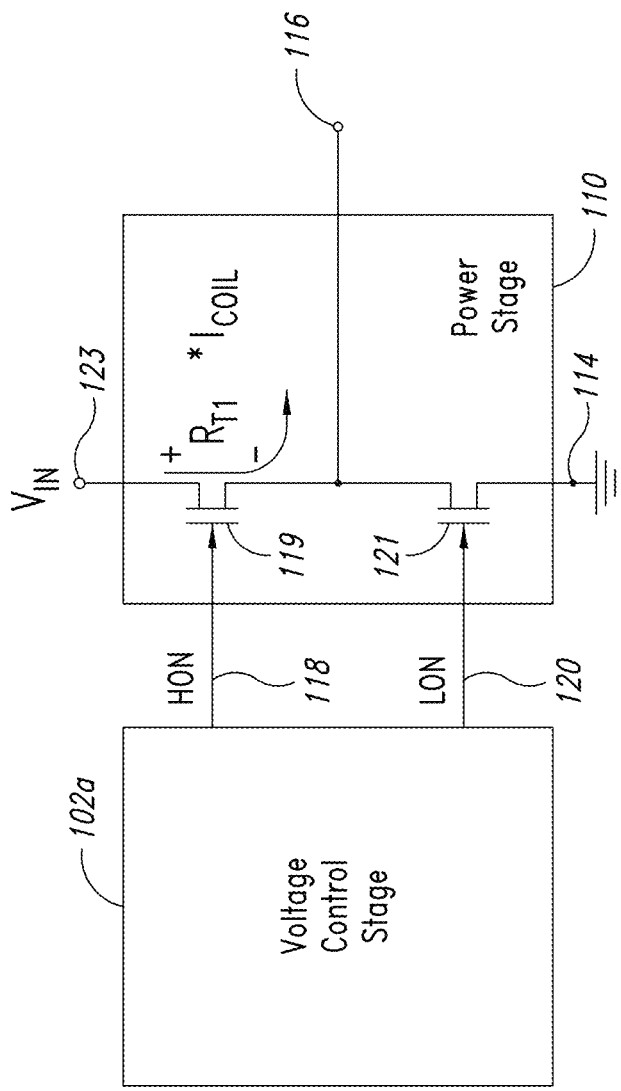
FIG. 2 shows a schematic of a power stage of the converter in accordance with an embodiment.

FIG. 2 shows a schematic of a power stage 110 of the converter 100 in accordance with an embodiment. The power stage 110 comprises a first transistor 119 and a second transistor 121 that are serially coupled between an input voltage node 123 and the ground node 114. The first transistor 119 and the second transistor 121 are both coupled to the intermediary node 116 of the converter 100.

In particular, a gate of the first transistor 119 is coupled to the voltage control stage 102a and is driven by the first power stage driving signal 118 output by the voltage control stage 102a. A drain of the first transistor 119 is coupled to the input voltage node 123 and a source of the first transistor 119 is coupled to the intermediary node 116. A gate of the second transistor 121 is coupled to the voltage control stage 102a and is driven by the second power stage driving signal 120 output by the voltage control stage 102a. A drain of the second transistor 121 is coupled to the intermediary node 116 and, thus, the source of the first transistor 119. A source of the second transistor 121 is coupled to the ground node 114.

During the high side of a control signal representing the duty cycle, the first power stage driving signal 118 is asserted such that the LC filter of the converter 100 is driven by the input voltage supplied by input voltage node 123. During the low side of the control signal, the second power stage driving signal 120 is asserted such that a ground voltage of zero is applied to the LC filter.

Figure 3:
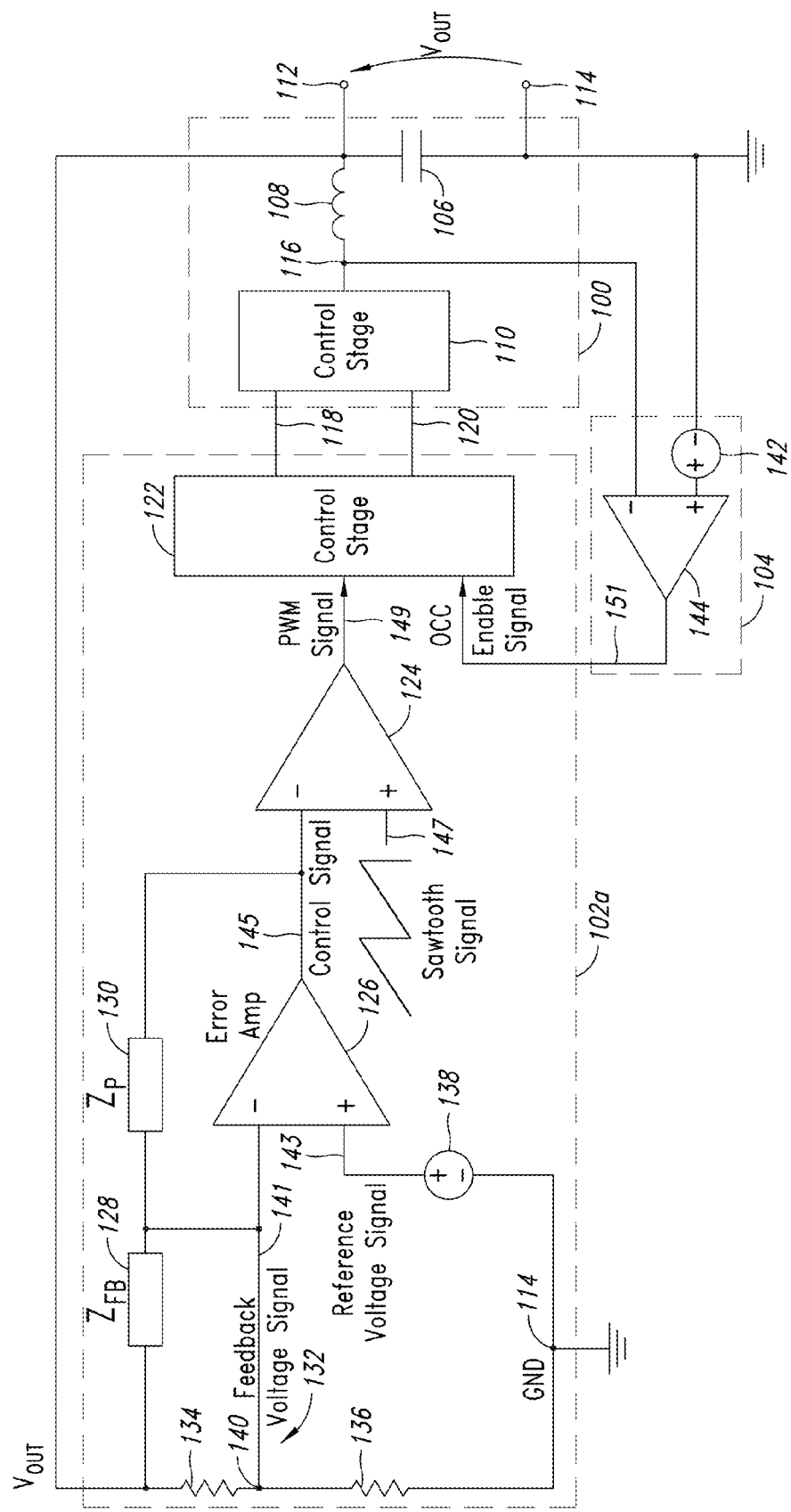
FIG. 3 shows a schematic of the converter controlled by a voltage control stage and an overcurrent control stage in accordance with an embodiment.

FIG. 3 shows a schematic of the converter 100 controlled by the voltage control stage 102a and the overcurrent control stage 104 in accordance with an embodiment. Similar elements in FIG. 3 as those described with reference to FIG. 1 have the same reference numerals.

The voltage control stage 102a comprises a control stage 122 for controlling the power stage 110 of the converter 100. The voltage control stage 102a also comprises a pulse width modulation comparator 124, an error amplifier 126, a first impedance 128, a second impedance 130, a voltage source 138 and a voltage divider circuit 132 comprising a first resistance 134 and a second resistance 136.

The voltage divider circuit 132 is coupled between the voltage output node 112 and the ground node 114. It is noted that the ground node 114 is used herein to refer to all nodes providing a zero reference voltage and serving as a ground.

A voltage divider node 140 (to which the first resistance 134 and the second resistance 136 are both coupled) is coupled to an inverting input of the error amplifier 126. The first impedance 128 is coupled between the voltage output node 112 and the voltage divider node 140. The second impedance 130 is coupled between the inverting input of the error amplifier 126 and the output of the error amplifier 126. An anode of the voltage source 138 is coupled to the ground node 114 and a cathode of the voltage source 138 is coupled to a non-inverting input of the error amplifier 126.

The output of the error amplifier 126 is coupled to the inverting input of the pulse width modulation comparator 124. A non-inverting input of the pulse width modulation comparator 124 is coupled to a voltage source (not shown) that provides a sawtooth signal 147. An output of the pulse width modulation comparator 124 is coupled to a first input of the control stage 122. The control stage 122 outputs the first and second power stage driving signals 118, 120 to the power stage 110 of the converter 100.

The overcurrent control stage 104 comprises a voltage source 142 and an overcurrent control comparator 144. An inverting input of the overcurrent control comparator 144 is coupled to the intermediary node 116 of the converter 100. The non-inverting input of the overcurrent control comparator 144 is coupled to a cathode of the voltage source 142. An anode of the voltage source 142 is coupled to the ground node 114. An output of the overcurrent control comparator 144 is coupled to a second input of the control stage 122 of the voltage control stage 102a.

Referring to the voltage control stage 102a, the voltage divider 132 scales the output voltage by the ratio of the first resistance 134 to the sum of the first and second resistances 134, 136. The voltage divider 132 produces at the voltage divider node 140 a scaled output voltage (referred to herein as a feedback voltage signal 141). The error amplifier 126 receives the feedback voltage signal 141 at the inverting input. The error amplifier 126 receives a reference voltage signal 143 that is output by the voltage source 138 at the non-inverting input. The error amplifier 126 outputs a control signal 145 that represents the difference between the feedback voltage signal 141 and the reference voltage signal 143.

Use of the voltage divider 132 permits having the voltage source 138 generate the reference voltage signal 143 having a voltage that is lower than the desired output voltage. However, in some embodiments, where the voltage source 138 generates a voltage having the same level as the desired output voltage, the voltage divider 132 may be disposed of. In these embodiments, the voltage output node may be directly coupled to the inverting input of the error amplifier 126.

The control signal 145 represents the deviation of the output voltage from the desired output voltage. When the output voltage is relatively close to the desired output voltage, the control signal 145 has a relatively small value. Conversely, when the difference between the output voltage and the desired output voltage is relatively large, the control signal 145 has a relatively large value. The pulse width modulation comparator 124 receives the control signal 145 at its non-inverting input and receives the sawtooth signal 147 at its inverting input. The pulse width modulation comparator 124 generates and outputs a pulse width modulation signal 149 that is asserted when the control signal 145 is greater than the sawtooth signal 147.

Figure 4:
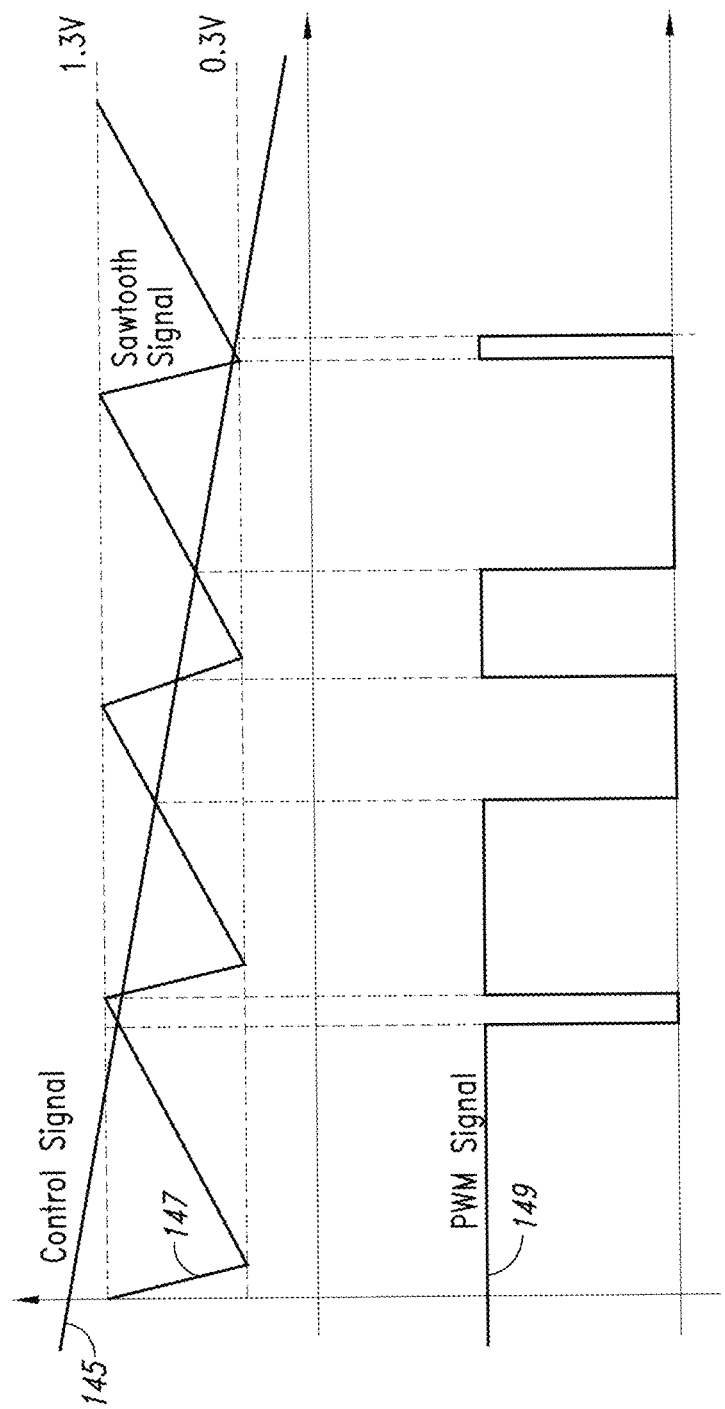
FIG. 4 shows an example of the generation of the pulse width modulation signal for driving the converter.

FIG. 4 shows an example of the generation of the pulse width modulation signal 149 for driving the control stage 122. The control signal 145, sawtooth signal 147 and a pulse width modulation signal 149 are shown in FIG. 4. The control signal 145 may have a relatively large value, for example, due to the fact that the output voltage is much lower than the desired output voltage. When the control signal 145 may have has a relatively large value, it is more likely to be greater than the sawtooth signal 147. In that case, the pulse width modulation signal 149 is more likely to be asserted. The longer the pulse width modulation signal 149 is asserted, the greater will be the duty cycle (i.e., the active period of the pulse width modulation signal 149 or the high side of the pulse width modulation signal 149). Increasing the duty cycle causes the output voltage of the converter 100 to also increase.

Conversely, when the output voltage is relatively close to the desired output voltage, the control signal 145 will have a relatively moderate value. The pulse width modulation signal 149 will, in turn, have a relatively moderate duty cycle or active period. This will result in keeping the output voltage of the converter 100 close to its present value.

Referring back to FIG. 3, the control stage 122 receives the pulse width modulation signal 149. The control stage 122 outputs the first and second power stage driving signals 118 in accordance with the pulse width modulation signal 149. The first and second power stage driving signals 118, 120 drive the power stage 110 of the converter 100 based on the pulse width modulation signal.

The overcurrent control stage 104 limits the duty cycle of the pulse width modulation signal 149 when an overcurrent condition is detected. The overcurrent control comparator 144 receives at its inverting input a voltage representative of the voltage of the intermediary node 116 of the converter 100. The overcurrent control comparator 144 receives at its non-inverting input a reference voltage supplied by the voltage source 142.

The voltage received at the inverting input represents the input voltage supplied at the input voltage node 123 ($V_{IN}$) less a voltage drop across the first transistor 119 ($V_{T1}$) or $V_{IN}-V_{T1}$. Because the voltage drop across the first transistor 119 may be represented by the product of the internal resistance of the first transistor 119 and the current that runs through the inductance 108 ($R_{T1}I_{coil}$), the voltage received at the inverting input may be represented as $V_{IN}-R_{T1}I_{coil}$. The voltage received at the inverting input is compared to an output voltage of the voltage source 142 that is represented as $V_{IN}-R_{T1}I_{OCP}$, where $I_{OCP}$ represents the rated current for the converter above which an overcurrent condition is deemed to exist. When $I_{coil}$ is greater than $I_{OCP}$, the overcurrent control comparator 144 outputs an overcurrent condition enable signal 151 that is asserted to represent detection of the overcurrent condition.

The control stage 122 receives the overcurrent condition enable signal 151. When the overcurrent condition enable signal 151 is asserted, the control stage 122 adjusts the pulse width modulation signal 149 by terminating or suppressing the duty cycle. The control stage 122 controls the power stage 110 of the converter 100 in accordance with the adjusted pulse width modulation signal 149. When the overcurrent condition enable signal 151 is de-asserted, the control stage 122 controls the power stage 110 in accordance with the pulse width modulation signal without adjustment.

Figure 5:
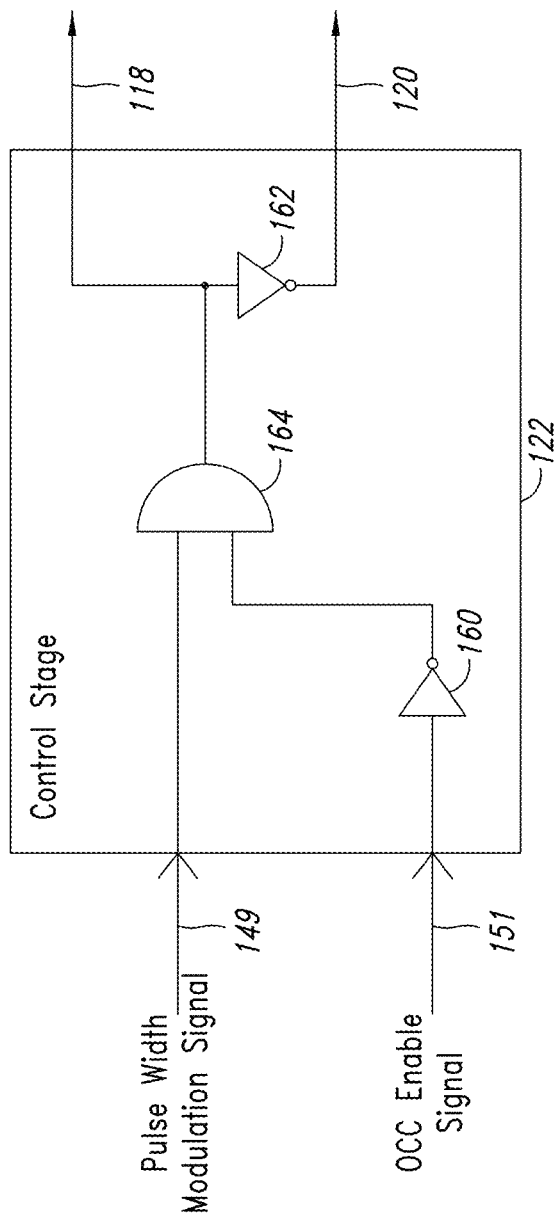
FIG. 5 shows a schematic of a control stage in accordance with an embodiment.

FIG. 5 shows a schematic of the control stage 122 in accordance with an embodiment. The control stage 122 comprises a first inverter 160, a second inverter 162 and logical conjunction operator (shown as an AND gate 164). An input of the first inverter 160 is coupled to an output of the overcurrent control comparator 144. The input of the first inverter 160 receives the overcurrent condition enable signal 151. An output of the first inverter 160 is coupled to a first input of the AND gate 164. A second input of the AND gate 164 is coupled to the output of the pulse width modulation comparator 124. The second input of the AND gate 164 receives the pulse width modulation signal 149.

An output of the AND gate 164 provides the first power stage driving signal 118. The output of the AND gate 164 is also coupled to an input of the second inverter 162. An output of the second inverter 162 provides the second power stage driving signal 120.

The control stage 122 suppresses the high side of the pulse width modulation signal 149 (by de-asserting the high side) and reduces the duty cycle of the pulse width modulation signal 149 when the overcurrent condition enable signal 151 is enabled. Thus, the output current ($I_{coil}$) of the converter 100 is reduced. When the overcurrent conditions end or no longer exist, the overcurrent condition enable signal 151 is de-asserted and the control stage 122 does not suppress the high side of the pulse width modulation signal 149.

Overcurrent control has an unintended consequence that negatively affects the operation of the voltage control stage 102a. Overcurrent control suppresses the pulse width modulation signal 149 during overcurrent conditions. However, overcurrent control leaves unaffected the reference voltage signal 143 used in generating the control signal 145. Overcurrent control only adjusts the duty cycle of the downstream pulse width modulation signal 149.

During an overcurrent condition, the control signal 145 has a voltage level that is not commensurate with the suppressed duty cycle of the pulse width modulation signal 149 used in operating the converter 100.

Overcurrent control reduces the current provided by the power stage 100. This lead to a reduction of the output voltage of the converter 100, thus reducing the voltage level of the feedback voltage signal 141. Reducing the output voltage causes the voltage level of the control signal 145 to increase beyond a level that is commensurate with the later suppressed pulse width modulation signal 149. When an overcurrent condition ends, there will be a discrepancy between the voltage level of the control signal 145 and the voltage level that the control signal 145 should have, had overcurrent control not been imposed. The discrepancy causes an output voltage overshoot that negatively impacts operation of the converter 100.

Figure 6:
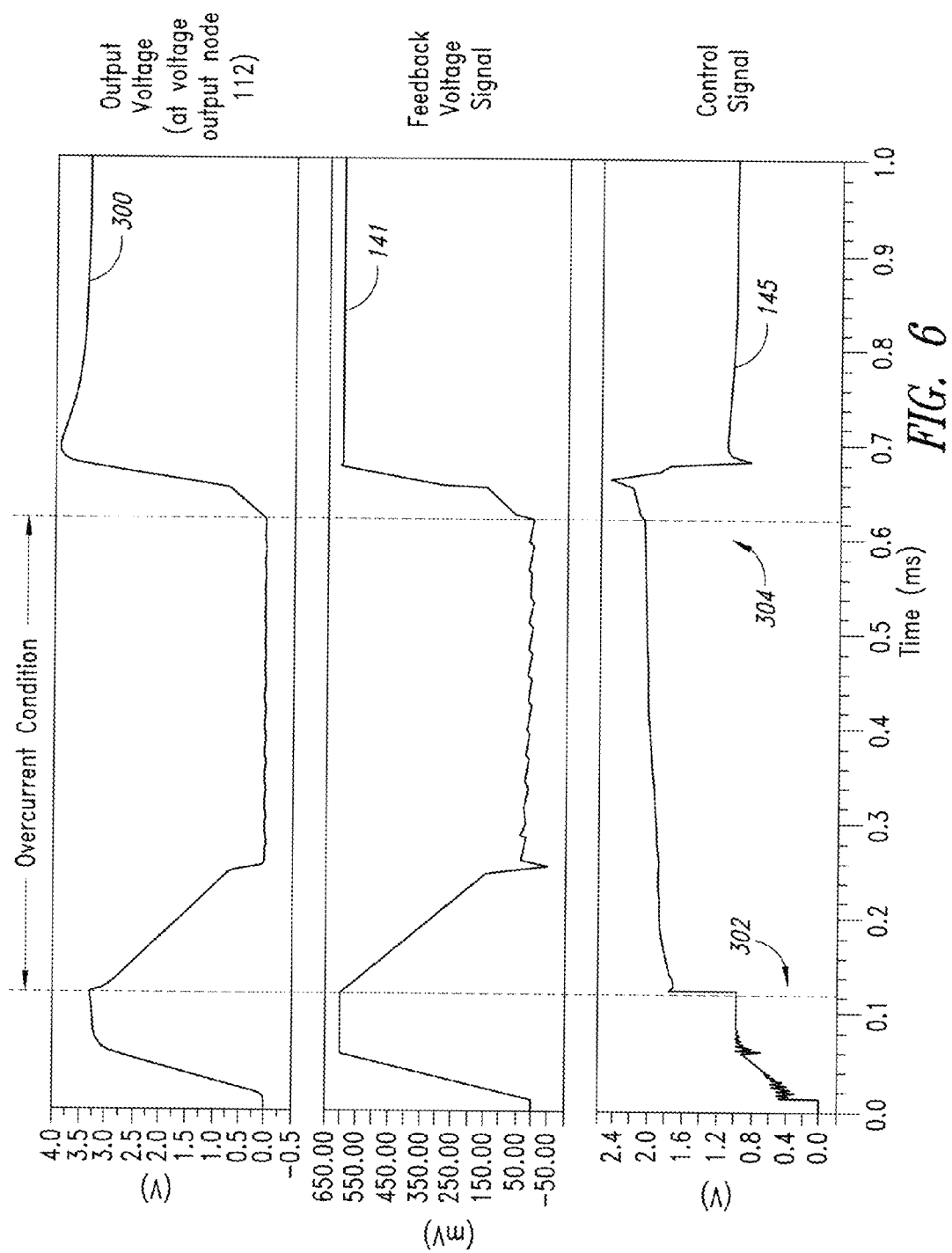
FIG. 6 shows an example of the diagrams of the output voltage signal, the feedback voltage signal and the control signal before, during and after an overcurrent condition.

FIG. 6 shows an example of the diagrams of the output voltage signal 300, the feedback voltage signal 141 and the control signal 145 before, during and after an overcurrent condition. Before a first time instant 302, the converter 100 is not experiencing an overcurrent condition. At the first time instant 302, the overcurrent control stage 104 detects an overcurrent condition. As a result, the duty cycle of the pulse width modulation signal 149 (not shown) is reduced. Reducing the duty cycle results in a reduction in the output voltage 300 and, consequently, the voltage level of feedback voltage signal 141. Because the voltage level of the reference voltage signal (not shown) is fixed, reducing the feedback voltage signal 141 results in an increase in the voltage level of the control signal 145. In the absence of the overcurrent condition, the increase in the voltage level of the control signal 145 should result in an increase in both the duty cycle and the output voltage signal 300 and drive down the control signal 145. However, because of the existence of the overcurrent condition, the duty cycle is suppressed and the increase in the voltage level of the control signal 145 is inconsequential. The control signal 145 remains at an elevated voltage level throughout the overcurrent condition.

At a second time instant 304, the overcurrent condition ends (for example, as a result of the load drawing less current). As a result, the limits imposed on the duty cycle by the overcurrent control stage 104 are removed. The voltage control stage 102a reacts solely based on the control signal 145. Because the control signal 145 has an elevated level, a relatively high duty cycle is used for driving the converter 100. The duty cycle is not suppressed because the overcurrent condition has ended. Accordingly, the output voltage signal 300 experiences an overshoot as shown in FIG. 6.

Figure 7:
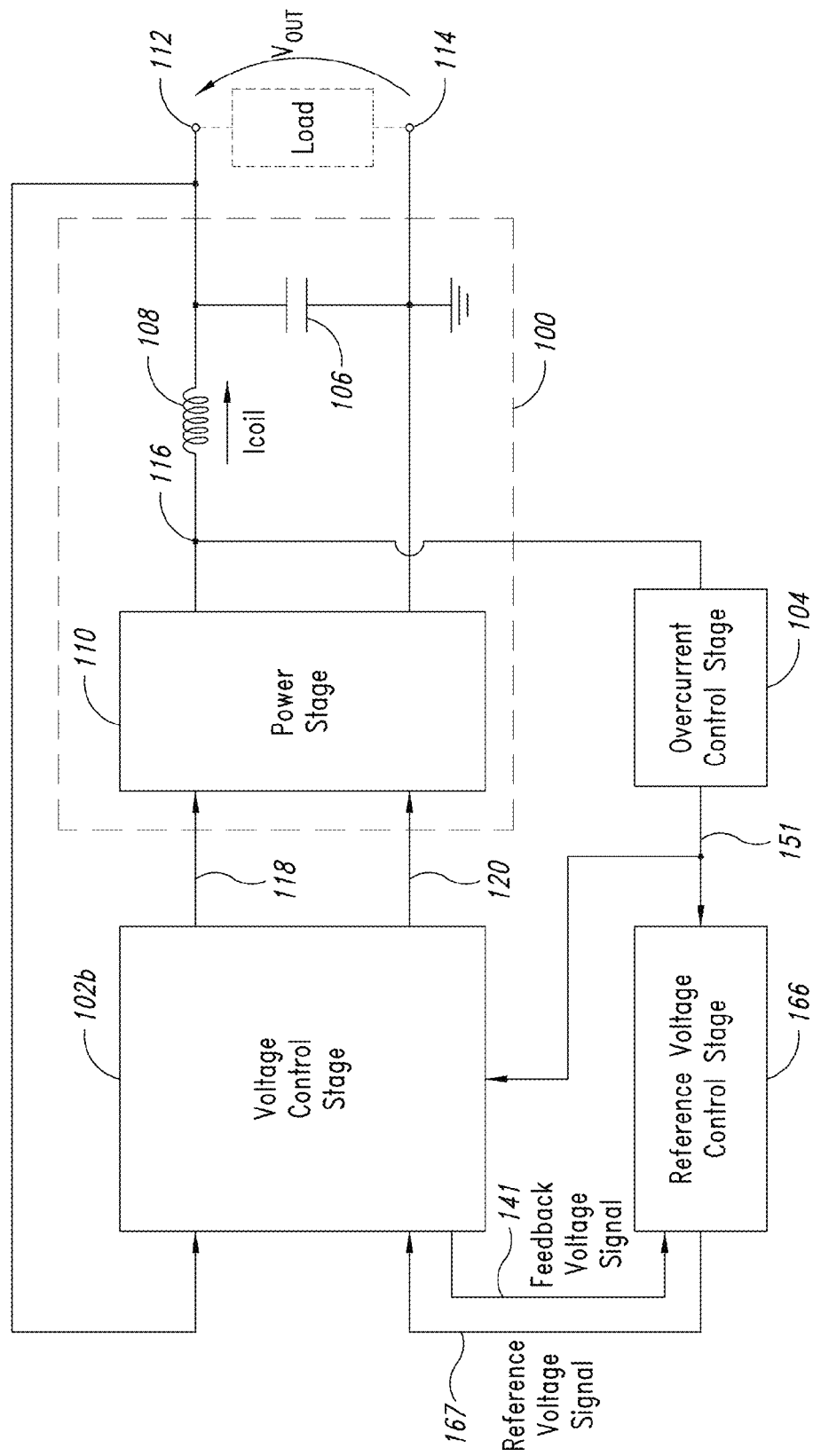
FIG. 7 shows a schematic of a converter controlled by a voltage control stage, an overcurrent control stage and a reference voltage control stage.

FIG. 7 shows a schematic of a converter 100 controlled by a voltage control stage 102b, an overcurrent control stage 104 and a reference voltage control stage 166. Similar elements shown in FIG. 7 as those described with reference to FIG. 1 have the same reference numerals.

A first input of the reference voltage control stage 166 is coupled to an output of the overcurrent control stage 104. A second input of the reference voltage control stage 166 is coupled to an output of the voltage control stage 102b. An output of the reference voltage control stage 166 is coupled to an input of the voltage control stage 102b.

At its first input, the reference voltage control stage 166 receives the overcurrent condition enable signal 151. At its second input, the reference voltage control stage 166 receives the feedback voltage signal indicating the feedback voltage used by the voltage control stage 166. The reference voltage control stage 166 adjusts the reference voltage such that the reference voltage tracks the feedback voltage. Tracking the reference voltage to the feedback voltage minimizes the difference between the reference voltage and the feedback voltage.

The reference voltage control stage 166 outputs a reference voltage signal 167 indicating the reference voltage to the voltage control stage 102b. The reference voltage signal 167 is representative of the reference voltage set by the reference voltage control stage 166. The voltage control stage 102b uses the reference voltage in determining the control signal 145. The reference voltage control stage 166 continues forcing the reference voltage to track the feedback voltage until the reference voltage returns to its pre-overcurrent condition level. The reference voltage may not return to its pre-overcurrent condition level until sometime after the end of the overcurrent condition.

Figure 8:
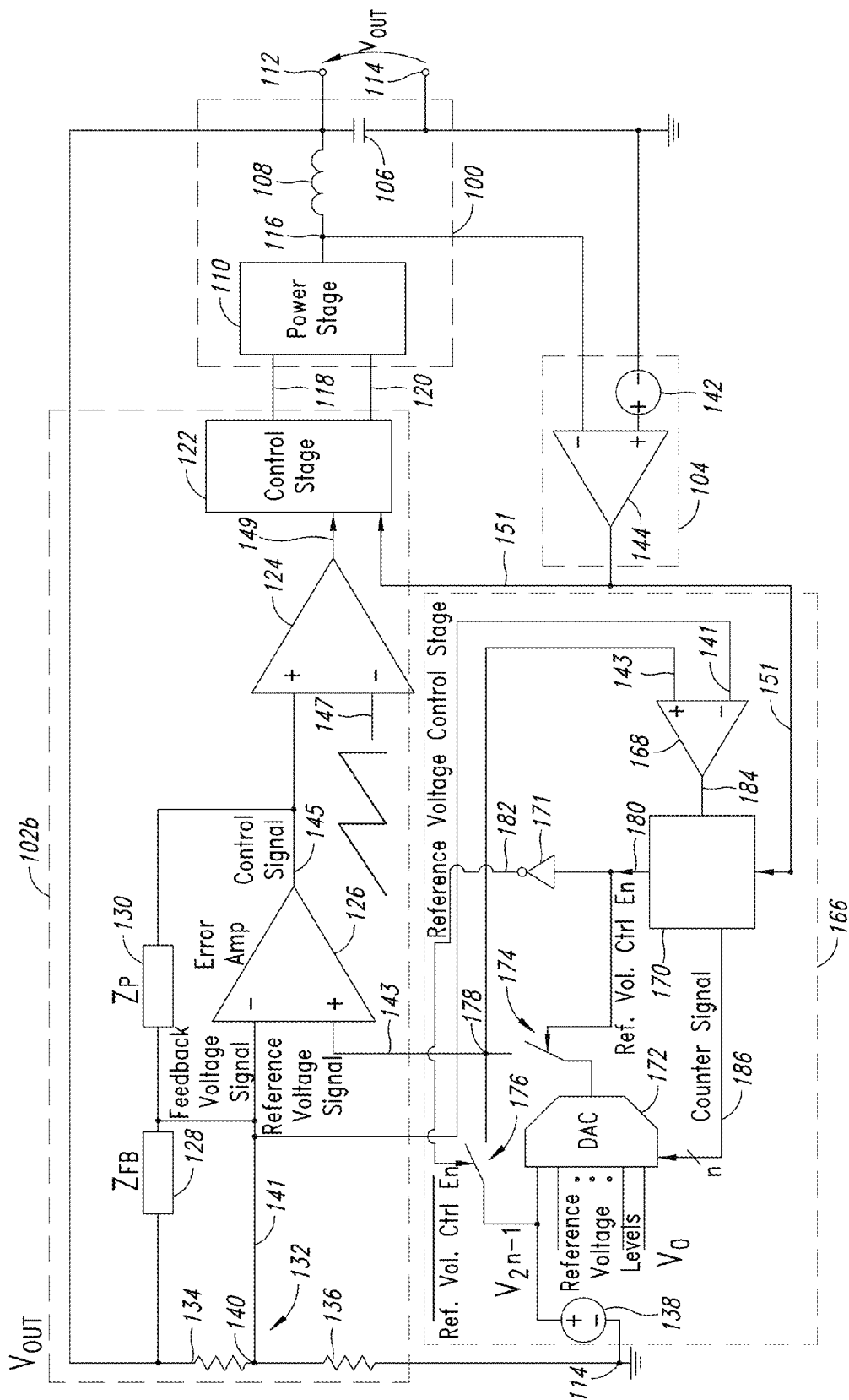
FIG. 8 shows a schematic of a converter controlled by a voltage control stage, an overcurrent control stage and a reference voltage control stage.

FIG. 8 shows a schematic of the converter 100 controlled by the voltage control stage 102b, the overcurrent control stage 104 and the reference voltage control stage 166. Similar elements shown in FIG. 8 as those described with reference to FIG. 3 have the same reference numerals.

The reference voltage control stage 166 comprises a reference voltage comparator 168, reference voltage control logic 170, an inverter 171, a digital-to-analog converter 172, a first switch 174 and a second switch 176. The reference voltage control stage 166 also comprises the voltage source 138 used for generating the reference voltage. The voltage source 138 was described with reference to FIG. 3 as being part of the voltage control stage 102a.

A non-inverting input of the reference voltage comparator 168 is coupled to the voltage divider node 140 and an inverting input of the reference voltage comparator 168 is coupled to a reference voltage node 178. An output of the reference voltage comparator 168 is coupled to a first input of the reference voltage control logic 170. A second input of the reference voltage control logic 170 is coupled to the output of the overcurrent control stage 104. A first output of the reference voltage control logic 170 is coupled to a control terminal of the first switch 174. The first output is also coupled to an input of the inverter 171. An output of the inverter 171 is coupled to a control terminal of the second switch 176. A second output of the reference voltage control logic 170 is coupled to a control terminal of the digital-to-analog converter 172.

The first switch 174 is coupled between an output of the digital-to-analog converter 172 and the reference voltage node 178. The digital-to-analog converter 172 has a plurality of inputs that respectively receive a plurality of reference voltage levels having decreasing voltage levels. A first reference voltage level of the plurality of reference voltage levels is received at a first input of the plurality of inputs. The first reference voltage level has the highest reference voltage level of the plurality of reference voltage levels.

An anode of the voltage source 138 is coupled to the ground node 114, and a cathode of the voltage source 138 is coupled to the first input of the digital-to-analog converter 172. The second switch 176 is coupled between the first input and the reference voltage node 178.

Operation of the reference voltage control stage 166 is described herein. The reference voltage control logic 170 receives the overcurrent condition enable signal 151 from the overcurrent control stage 104. The overcurrent condition enable signal 151 is asserted to indicate that an overcurrent condition is detected. In response to the assertion of the overcurrent condition enable signal 151, the reference voltage control logic 170 asserts a reference voltage control enable signal 180. The reference voltage control logic 170 outputs the reference voltage control enable signal 180 at its first output.

The first inverter 171 inverts the reference voltage control enable signal 180 and outputs a complementary reference voltage control enable signal 182 that is de-asserted. The first inverter 171 outputs the complementary reference voltage control enable signal 182 to the control terminal of the second switch 176. The complementary reference voltage control enable signal 182 switches the second switch 176 to the electrically non-conductive state (i.e., open state). As a result of switching the second switch 176 to the electrically non-conductive state, the error amplifier 126 ceases receiving the reference voltage signal 143 provided by the voltage source 138. That is, the error amplifier 126 ceases receiving the reference voltage signal 143 having the first reference voltage level. The first reference voltage level is no longer provided at the reference voltage node 178.

While the complementary reference voltage control enable signal 182 is received at the control terminal of the second switch 176, the reference voltage control enable signal 180 is received at the control terminal of the first switch 174. Assertion of the reference voltage control enable signal 180 switches the first switch 174 to the electrically conductive state (i.e., closed state). As a result of closing the first switch 174, a reference voltage level provided by the digital-to-analog converter 172 is provided at the reference voltage node 178. The same reference voltage level is provided to the error amplifier 126. As a result of opening the second switch 176 and closing the first switch 174, the reference voltage level used in controlling the converter 100 ceases to be static. Instead, the reference voltage level is dynamically controlled as described herein.

The reference voltage comparator 168 receives the feedback voltage signal 141 and the reference voltage signal 143 and compares the signals 141, 143. The reference voltage comparator 168 outputs a comparison signal 184. The comparison signal 184 is asserted when the reference voltage level of the reference voltage signal 143 is greater than the voltage level of the feedback voltage signal 141. The comparison signal 184 is de-asserted when the reference voltage level of the reference voltage signal 143 is less than the voltage level of the feedback voltage signal 141.

The reference voltage control logic 170 receives the comparison signal 184. The reference voltage control logic 170 outputs a counter signal 186 based on the comparison signal 184. The comparison signal 184 may be output over a bus (for example, an n-bit bus) and may take on values between 0 and $2^n-1$.

When the comparison signal 184 is asserted (i.e., the reference voltage level of the reference voltage signal 143 is greater than the voltage level of the feedback voltage signal 141), the value of the counter signal 186 is decremented. When the comparison signal 184 is de-asserted (i.e., the reference voltage level of the reference voltage signal 143 is less than the voltage level of the feedback voltage signal 141), the value of the counter signal 186 is incremented. Initially and at the start of an overcurrent condition, the counter signal 186 may have a maximum value of $2^n-1$. As the duty cycle of the pulse width modulation signal 149 is decreased during the overcurrent condition, the value of the counter signal 186 may be decremented.

The digital-to-analog converter 172 receives the counter signal 186. The digital-to-analog converter 172 selects one of the plurality of reference voltage levels respectively received at the plurality of inputs based on the value of the counter signal 186. The digital-to-analog converter 172 outputs the selected reference voltage level. The selected reference voltage level is provided at the reference voltage node 178 and the non-inverting input of the error amplifier 126.

At the start of the overcurrent condition, the counter signal 186 will have a value of $2^n-1$ and the first reference voltage level (corresponding to the voltage level output by the voltage source 138) will be output by the digital-to-analog converter 172. As the duty cycle is reduced during the overcurrent condition, the voltage level of the feedback voltage signal 141 will be reduced. The reference voltage comparator 168 and the reference voltage control logic 170 operate to reduce the value of the counter signal 186. The digital-to-analog converter 172 reacts by selecting and outputting a lower reference voltage level. The reference voltage control stage 166 operates to maintain the selected reference voltage level as close as possible to the voltage level of the feedback voltage signal 141.

When the overcurrent control stage 104 determines that the overcurrent condition has ended, the overcurrent control stage 104 de-asserts the overcurrent condition enable signal 151. The reference voltage control logic 170 receives the de-asserted overcurrent condition enable signal 151. When the overcurrent condition ends, the value of the counter signal 186 may be lower than its maximum value (for example, of $2^n-1$). The reference voltage control logic 170 continues asserting the reference voltage control enable signal 180. The reference voltage control logic 170 continues tracking the reference voltage level to the voltage level of the feedback voltage signal 141 (i.e., continues a reference voltage control phase) after the end of the overcurrent condition. The reference voltage control logic 170 de-asserts the reference voltage control enable signal 180 (and ceases the reference voltage control phase and ceases tracking the reference voltage level to the voltage level of the feedback voltage signal 141) when the counter signal 186 reaches its maximum value. The maximum value may be the value of the counter signal 186 when the reference voltage control phase began. The first switch 174 is switched to the electrically non-conductive state and the second switch 176 is switched to the electrically conductive state. The first reference voltage level is provided by the reference voltage control stage 166 until another overcurrent condition is detected, at which point the reference voltage level is made to track the voltage level of the feedback voltage signal 141.

Figure 9:
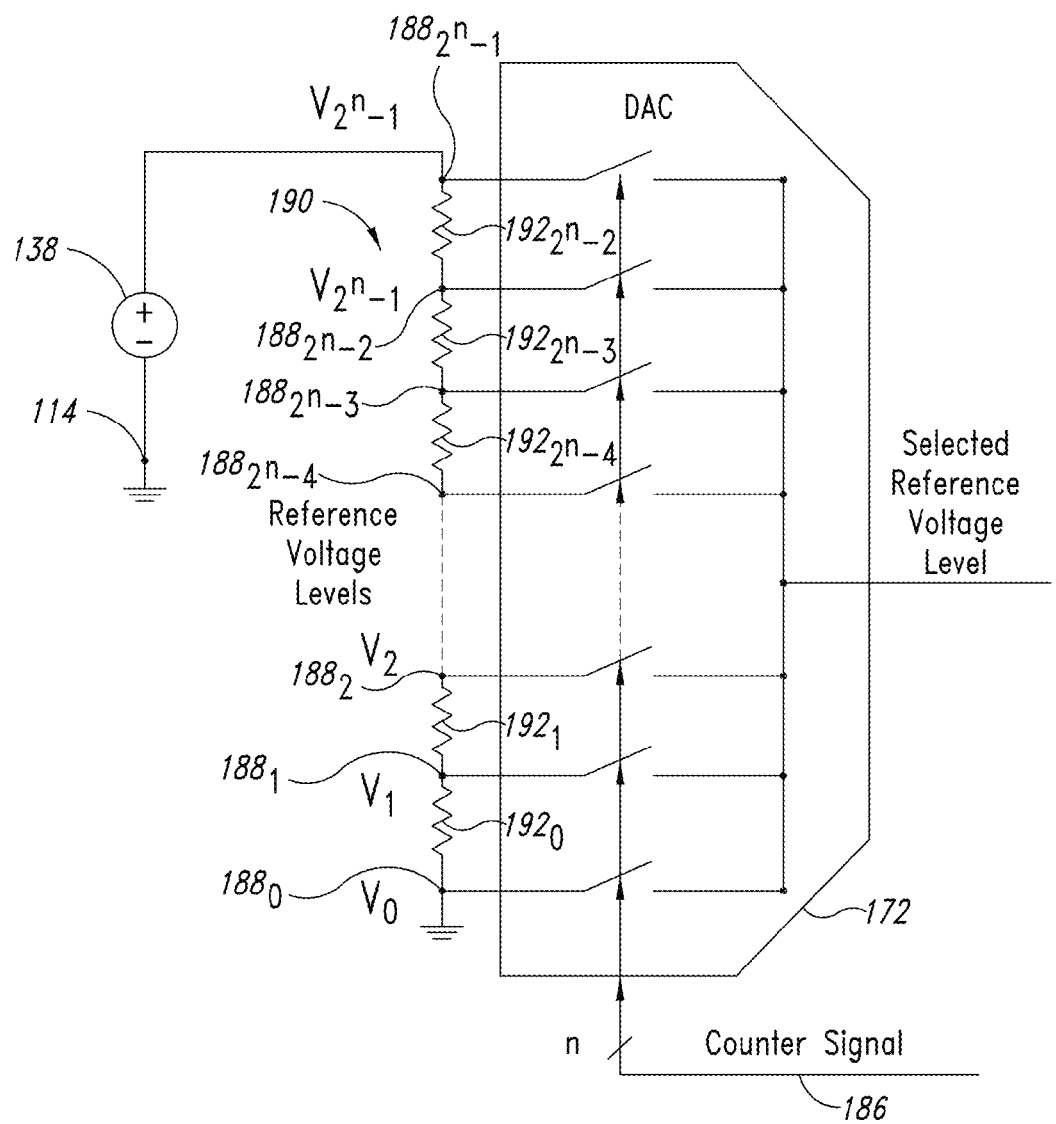
FIG. 9 shows a digital-to-analog converter for supplying a selected reference voltage level from among a plurality of reference voltage levels.

FIG. 9 shows a digital-to-analog converter 172 for supplying a selected reference voltage level from among a plurality of reference voltage levels. The digital-to-analog converter 172 has a plurality of inputs $188_{2^n-1}$-$188_0$. Each input of the plurality of inputs $188_{2^n-1}$-$188_0$ receives a respective reference voltage level of a plurality of reference voltage levels. The reference voltage levels are decreasing in voltage.

As shown in FIG. 9, a first input $188_{2^n-1}$ receives a first reference voltage level that is the highest reference voltage level of the plurality of reference voltage levels. The first reference voltage level is provided by the voltage source 138. A last input $188_0$ receives the lowest reference voltage level of the plurality of reference voltage levels, which is a ground voltage of zero volts.

A voltage divider 190 comprising a plurality of resistances $192_{2^n-2}$-$192_0$ is used to provide the remaining references voltages $188_{2^n-2}$-$188_0$. A first resistance $192_{2^n-2}$ of the plurality of resistances $192_{2^n-2}$-$192_0$ is coupled between the first input $188_{2^n-1}$ and the second input $188_{2n-2}$. A second resistance $192_{2^n-3}$ of the plurality of resistances $192_{2^n-2}$-$192_0$ is coupled between the second input $188_{2^n-2}$ and the third input $188_{2^n-3}$ and so on. Due to the voltage division, the second reference voltage level provided at the second input $188_{2^n-2}$ is less than the first reference voltage level provided at the first input $188_{2^n-1}$ and so on. If the plurality of resistances $192_{2^n-2}$-$192_0$ each has equal resistance values, then each subsequent reference voltage level after the first reference voltage level is decremented by a voltage level that is a quotient of the first reference voltage level and $2^n-1$.

The digital-to-analog converter 172 receives the counter signal 186 having a value between 0 and $2^n-1$. The digital-to-analog converter 172 selects and outputs the reference voltage level corresponding to the value of the counter signal 186.

Figure 10:
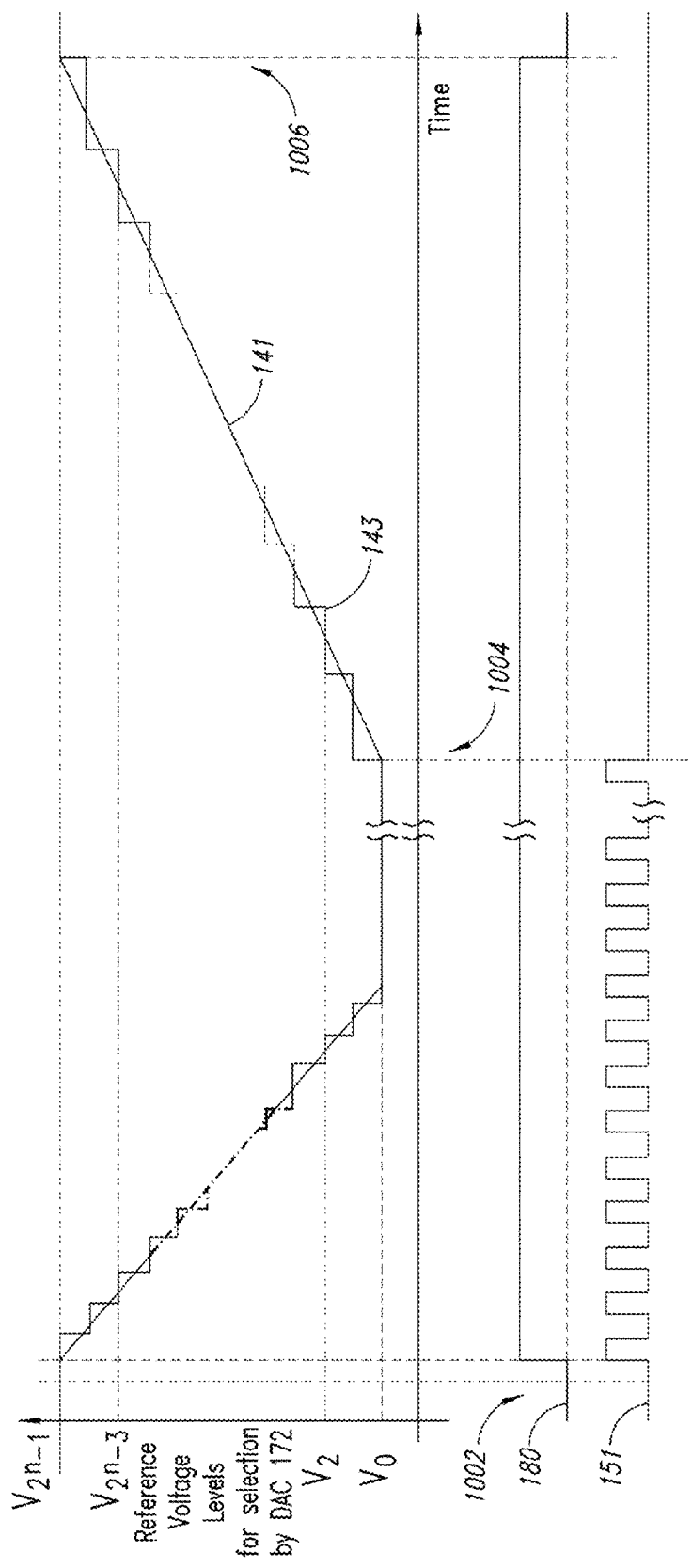
FIG. 10 shows diagrams of the overcurrent condition enable signal, reference voltage control enable signal, feedback voltage signal and the reference voltage signal during an overcurrent condition.

FIG. 10 shows diagrams of the overcurrent condition enable signal 151, reference voltage control enable signal 180, feedback voltage signal 141 and the reference voltage signal 143 during an overcurrent condition. At a first time instant 1002, the overcurrent condition enable signal 151 is asserted by the overcurrent control stage 104, indicating that an overcurrent condition has been detected. In response to the assertion of the overcurrent condition enable signal 151, the reference voltage control stage 166 asserts the reference voltage control enable signal 180. Assertion of the reference voltage control enable signal 180 commences tracking the voltage level of the reference voltage signal 143 to that of the feedback voltage signal 141.

During the overcurrent condition, the duty cycle of the pulse width modulation signal 149 (not shown) is reduced. The reduction in the duty cycle results in reducing the current provided by the power stage 100 and consequently the output voltage and consequently the voltage level of the feedback voltage signal 141. The reference voltage control stage 166 responds by reducing the voltage level of the reference voltage signal 143 to track that of the feedback voltage signal 141. Because the digital-to-analog converter 172 is finite, the voltage level of the reference voltage signal 143 may not be identical to that of the feedback voltage signal 141, but it will be as close as possible given the resolution of the digital-to-analog converter 172 and its input reference voltage levels.

At a second time instant 1004, the overcurrent control stage 104 de-asserts the overcurrent condition enable signal 151, indicating that the overcurrent condition has ended. The ending of the overcurrent condition does not automatically trigger de-assertion of the reference voltage control enable signal 180 and ceasing tracking of the voltage level of the reference voltage signal 143. Conversely, the reference voltage control logic 170 detects that the voltage level of the reference voltage signal 143 does not correspond to (or is not the same as) the voltage output by the voltage source 138. That is, the reference voltage control logic 170 detects that the counter signal 186 is not at its maximum value. Accordingly, the reference voltage control logic 170 continues asserting the reference voltage control enable signal 180 after the end of the overcurrent condition. As a result, the overcurrent control stage 104 continues setting the voltage level of the reference voltage signal 143 to the voltage level of the feedback voltage signal 141.

When the overcurrent condition ends, any limits imposed on the duty cycle are removed. Consequently, the voltage level of the feedback voltage signal 141 increases. The reference voltage control stage 166 incrementally increases the voltage level of the reference voltage signal 143 to track the voltage level of the feedback voltage signal 141. The reference voltage control stage 166 continues setting the voltage level of the reference voltage signal 143 to be as close as possible to the voltage level of the feedback voltage signal 141 while the reference voltage control enable signal 180 is asserted.

The reference voltage control logic 170 de-asserts the reference voltage control enable signal 180 at the third time instant 1006 when the voltage level of the reference voltage signal 143 reaches the output voltage of the voltage source 138. In response to the de-assertion of the reference voltage control enable signal 180, the reference voltage control stage 166 ceases setting the voltage level of the reference voltage signal 143 to be as close as possible to the voltage level of the feedback voltage signal 141. Instead, the voltage level of the reference voltage signal 143 is set to the static voltage level output by the voltage source 138.

Thus, when the overcurrent condition ends at the second time instant 1004, the voltage levels of the reference voltage signal 143 and the feedback voltage signal 141 are comparable. An overshoot in the output voltage of the converter 100 is avoided.

Figure 11:
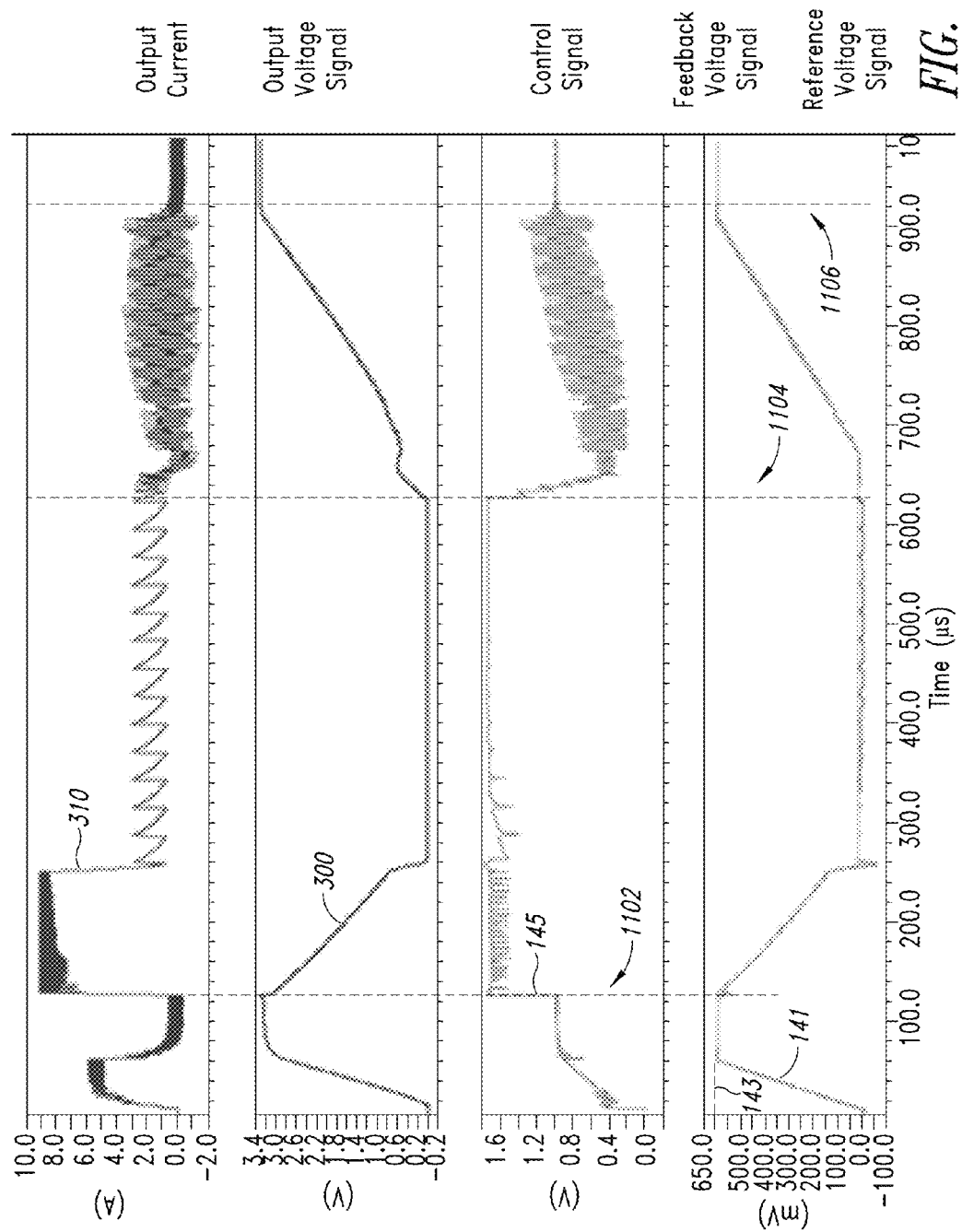
FIG. 11 shows an example of the diagrams of the output current, output voltage signal, control signal, feedback voltage signal and reference voltage signal under reference voltage control.

FIG. 11 shows an example of the diagrams of the output current 310, output voltage signal 300, control signal 145, feedback voltage signal 141 and reference voltage signal 143 under reference voltage control. At a first time instant 1102, the overcurrent condition begins and thereafter the output current 310 increases. The overcurrent control stage 104 keeps the output current 310 below a maximum level. The voltage level of the output voltage signal 300 decreases and so does the voltage level of the feedback voltage signal 141. The reference voltage control stage 166 operates to retain the voltage level of the reference voltage signal 143 as close as possible to the voltage level of the feedback voltage signal 141.

At a second time instant 1104, the overcurrent condition ends. The reference voltage control stage 166 continues step-wise tracking of the voltage level of the reference voltage signal 143. At a third time instant 1106, the voltage level of the output voltage signal 300 recovers to its pre-overcurrent condition level. At that time, the reference voltage control ends.

Figure 12:
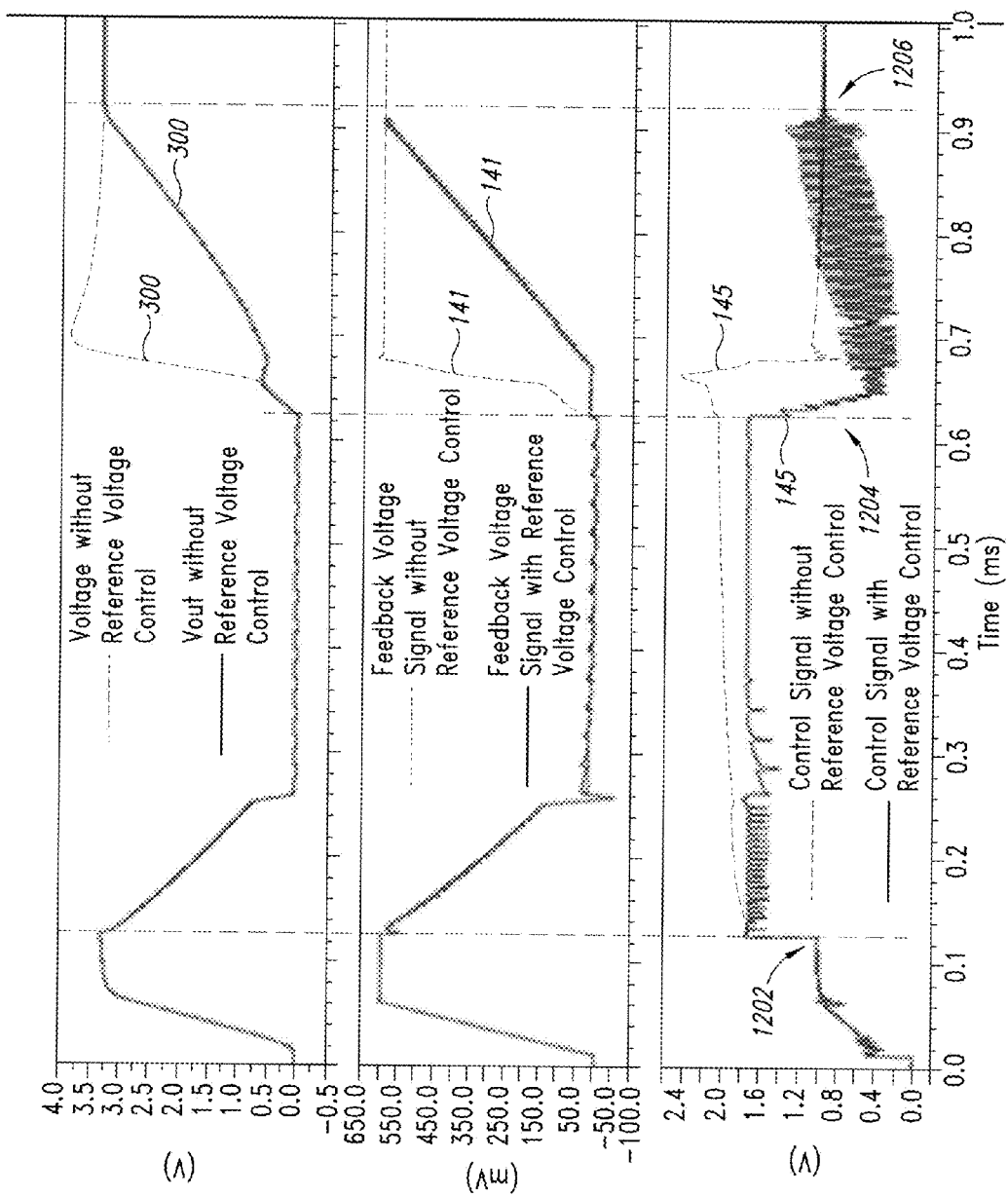
FIG. 12 shows a comparison between the diagrams of the output voltage signal, feedback voltage signal and reference voltage signal with and without reference voltage control.

FIG. 12 shows a comparison between the diagrams of the output voltage signal 300, feedback voltage signal 141 and reference voltage signal 143 with and without reference voltage control. The overcurrent condition begins at a first time instant 1202. In response, the overcurrent control stage 104 imposes overcurrent control. As a result, the voltage levels of the output voltage signal 300 and feedback voltage signal 141 decreases. When reference voltage control is not imposed, the voltage level of the control signal 145 (in the dashed line) increases to undesirable levels. However, when reference voltage control is imposed, the voltage level of the control signal 145 (in the solid line) is retained within a range and is not elevated.

The overcurrent condition ends at a second time instant 1204. When reference voltage control is not imposed, the elevated voltage level of the control signal 145 causes an overshoot in the voltage level of the output voltage signal 300. However, when reference voltage control is imposed, the voltage level of the control signal 145 (in the solid line) is not elevated. As a result the output voltage steadily increases to a desired value. At a third time instant 1206, the reference voltage control ends.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device comprising:
a voltage converter having an input and an output and being configured to receive, at the input, a control signal for operating the voltage converter in accordance with a duty cycle and provide, at the output, an output voltage;
a voltage control stage having a first input coupled to the output of the voltage converter, a second input, a third input and an output coupled to the input of the voltage converter and configured to:
receive, at the first input, a feedback voltage signal representative of the output voltage,
receive, at the second input, a reference voltage signal,
receive, at the third input, an overcurrent protection signal,
generate the control signal based on a difference between the feedback voltage signal and the reference voltage signal,
limit the duty cycle of the control signal in response to the overcurrent protection signal being asserted, and
output the control signal at the output of the voltage control stage; and
an overcurrent control stage having an input coupled to the output of the voltage converter and an output coupled to the third input of the voltage control stage and configured to detect an overcurrent condition in the voltage converter, assert the overcurrent protection signal in response to detecting the overcurrent condition and output the overcurrent protection signal at the output of the overcurrent control stage; and
a reference voltage control stage having an input coupled to the output of the overcurrent control stage and an output coupled to the second input of the voltage control stage and configured to receive the overcurrent protection signal, in response to the overcurrent protection signal being asserted, enable a reference voltage control phase that causes the reference voltage signal to track the feedback voltage signal and the control signal to be limited during the overcurrent condition, and output the reference voltage signal at the output of the reference voltage control stage.

2. The device of claim 1, wherein the overcurrent control stage is configured to detect the overcurrent condition when an output current of the voltage converter exceeds a threshold for the output current.

3. The device of claim 1, wherein the reference voltage control stage is configured to cause the reference voltage signal to track the feedback voltage signal by selecting, from a plurality of reference voltage levels, a reference voltage level that is closest to a voltage level of the feedback voltage signal and setting a voltage level of the reference voltage signal to the reference voltage level of the plurality of reference voltage levels.

4. The device of claim 1, wherein the reference voltage control stage is configured to:
determine that a voltage level of the reference voltage signal that tracks the feedback voltage signal has returned to its voltage level prior to enablement of the reference voltage control phase; and
disable the reference voltage control phase in response to determining that the voltage level of the reference voltage signal that tracks the feedback voltage signal has returned to its voltage level prior to the enablement of the reference voltage control phase.

5. The device of claim 4, wherein the reference voltage control stage is configured to set the voltage level of the reference voltage signal to a static reference voltage level when the reference voltage control phase is disabled.

6. The device of claim 1, wherein the reference voltage control stage includes:
a comparator having an inverting input for receiving the reference voltage signal, a non-inverting input for receiving the feedback voltage signal and an output for providing a comparison signal;
control logic having an input coupled to the output of the comparator and an output for providing a counter signal, the control logic being configured to determine a logical value for the counter signal based on whether the comparison signal is asserted or not asserted;
a digital-to-analog converter having a control input coupled to the output of the control logic, a plurality of reference voltage inputs for receiving a plurality of reference voltage levels, respectively, and an output, the digital-to-analog converter being configured to select a reference voltage level of the plurality of reference voltage levels based on the counter signal and provide, at the output of the digital-to-analog converter, the selected reference voltage level; and
voltage setting circuitry coupled to the output of the digital-to-analog converter and configured to set a voltage level of the reference voltage signal to the selected reference voltage level when the reference voltage control phase is enabled.

7. A device comprising:
a voltage control stage configured to receive a reference voltage signal and a feedback voltage signal representative of an output voltage of a converter and output, based on a difference between the feedback voltage signal and the reference voltage signal, a control signal for operating the converter in accordance with a duty cycle, the voltage control stage being configured to receive an overcurrent protection signal and limit the duty cycle when the overcurrent protection signal is asserted;

an overcurrent control stage configured to detect an overcurrent condition in the converter, and assert the overcurrent protection signal in response to detecting the overcurrent condition; and a reference voltage control stage configured to enable a reference voltage control phase in response to the overcurrent protection signal being asserted and cause the reference voltage signal to track the feedback voltage signal when the reference voltage control phase is enabled.

8. The device of claim 7, wherein the overcurrent control stage is configured to detect the overcurrent condition in response to an output current of the converter exceeding a threshold for the output current.

9. The device of claim 7, wherein the reference voltage control stage is configured to cause the reference voltage signal to track the feedback voltage signal by selecting, from a plurality of reference voltage levels, a reference voltage level that is closest to a voltage level of the feedback voltage signal and setting the voltage level of the reference voltage signal to the reference voltage level of the plurality of reference voltage levels.

10. The device of claim 7, wherein the reference voltage control stage is configured to:

determine that a voltage level of the reference voltage signal that tracks the feedback voltage signal has returned to its voltage level prior to enablement of the reference voltage control phase; and disable the reference voltage control phase in response to determining that the voltage level of the reference voltage signal that tracks the feedback voltage signal has returned to its voltage level prior to the enablement of the reference voltage control phase.

11. The device of claim 10, wherein the reference voltage control stage is configured to set the voltage level of the reference voltage signal to a static reference voltage level when the reference voltage control phase is disabled.

12. The device of claim 7, wherein the reference voltage control stage includes:

a comparator having an inverting input for receiving the reference voltage signal, a non-inverting input for receiving the feedback voltage signal and an output for providing a comparison signal;

control logic having an input coupled to the output of the comparator and an output for providing a counter signal, the control logic being configured to determine a logical value for the counter signal based on whether the comparison signal is asserted or not asserted;

a digital-to-analog converter having a control input coupled to the output of the control logic, a plurality of reference voltage inputs for receiving a plurality of reference voltage levels, respectively, and an output, the digital-to-analog converter being configured to select a reference voltage level of the plurality of reference voltage levels based on the counter signal and provide, at the output of the digital-to-analog converter, the selected reference voltage level; and voltage setting circuitry coupled to the output of the digital-to-analog converter and configured to set a voltage level of the reference voltage signal to the selected reference voltage level in response to the reference voltage control phase being enabled.

13. A method comprising:

operating a converter in accordance with a duty cycle and based on a difference between a feedback signal representing an output voltage of the converter and a reference signal;

detecting an overcurrent condition in the converter;

in response to detecting the overcurrent condition:
    limiting the duty cycle used to operate the converter; and
    causing the reference signal to track the feedback signal to mitigate an output voltage overshoot at an end of the overcurrent condition;

determining that a voltage level of the reference signal that tracks the feedback signal has returned to its voltage level prior to detecting the overcurrent condition in the converter; and ceasing tracking the reference signal to the feedback signal in response to determining that the voltage level of the reference signal that tracks the feedback signal has returned to its voltage level prior to detecting the overcurrent condition.

14. The method of claim 13, wherein causing the reference signal to track the feedback signal causes a control signal generated based on the difference during the overcurrent condition to be limited.

15. The method of claim 13, wherein detecting the overcurrent condition in the converter includes detecting that an output current of the converter exceeds a threshold for the output current.

16. The method of claim 13, wherein causing the reference signal to track the feedback signal includes:

selecting, from a plurality of reference voltage levels, a reference voltage level that is closest to a voltage level of the feedback signal; and setting the voltage level of the reference signal to the reference voltage level of the plurality of reference voltage levels.

17. The method of claim 13, wherein ceasing tracking the reference signal to the feedback signal includes setting the voltage level of the reference signal to a static reference voltage level.

18. The method of claim 17, further comprising:

prior to detecting the overcurrent condition, setting the voltage level of the reference signal to the static reference voltage level.

* * * * *